United States Patent Office 3,531,089
Patented Sept. 29, 1970

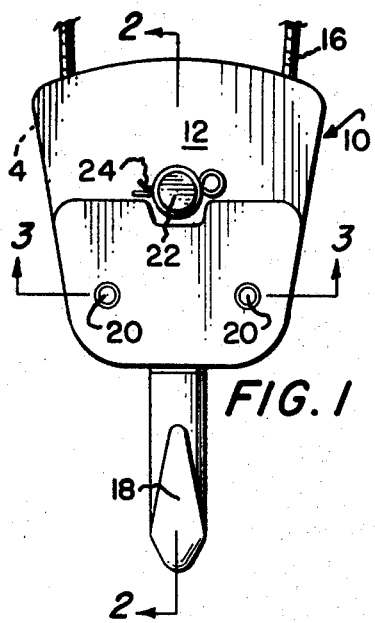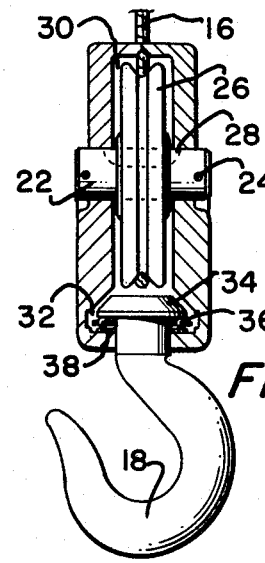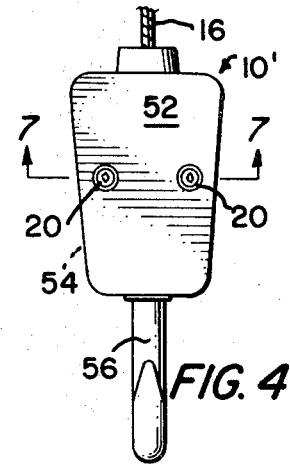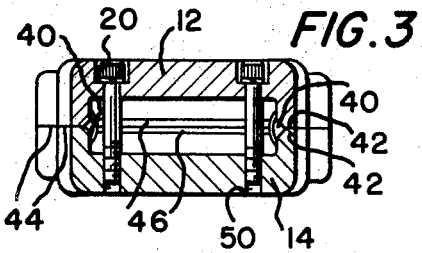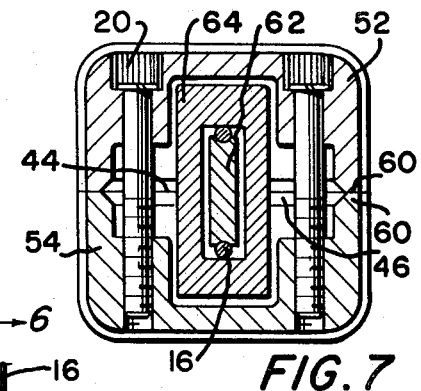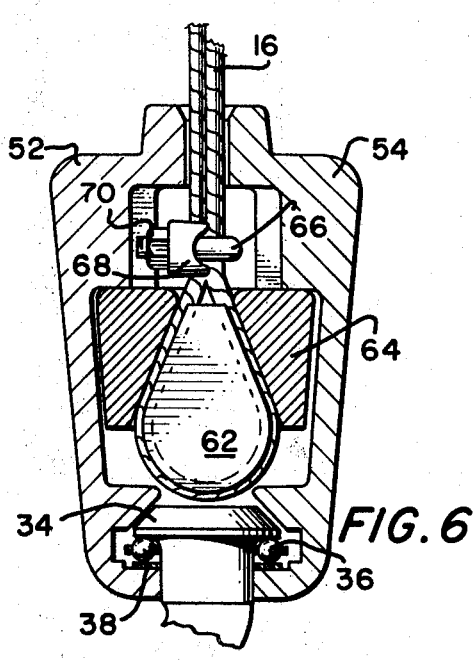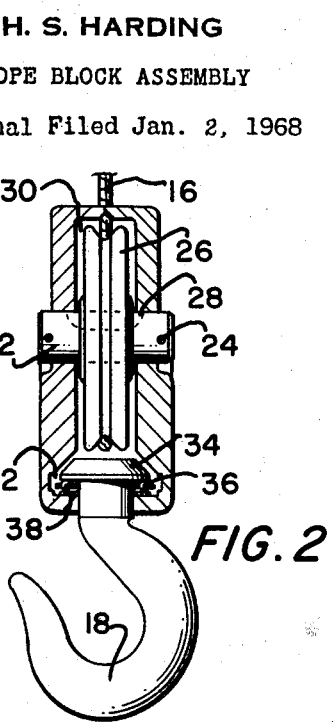

3,531,089
ROPE BLOCK ASSEMBLY
Harold S. Harding, Milan, Pa., assignor to Ingersoll-Rand Company, New York, N.Y., a corporation of New Jersey
Continuation of application Ser. No. 695,028, Jan. 2, 1968. This application Nov. 7, 1969, Ser. No. 871,642
Int. Cl. B66d 1/36
U.S. Cl. 254—192                             1 Claim

ABSTRACT OF THE DISCLOSURE

The structure, and method of producing same, in which a single, hollow casting is split to form irregular-edged, mating surfaces in the halves. The hollow receives the rope supporting components, and the irregularity of the surfaces insures an intimate, aligned, and non-slip mating of the halves on reassembly.

This is a continuation of application Ser. No. 695,028, now abandoned.

This invention relates to rope blocks and more particularly to rope blocks which carry rope supporting components for use with hoists and the like.

Known rope block assemblies are formed of two mating castings, shell-like in configuration which, when joined, define an enclosure therebetween for the carriage therewithin of rope supporting components. The two castings have rough-cast mating edges which, normally thereafter, are machined to facilitate a flat, smooth interface of the one with the other. Unless doweling is provided, or keying of some type is machined therein, there occurs some difficulty in properly aligning the two castings for assembly. This occurs because the mating edges of the castings are machined smooth; one casting can freely slide relative to the other. Also, such alignment means are necessitated to militate against the sliding displacement of one casting relative to the other under dynamic conditions of use.

An ideal rope block assembly would be one constructed of a single one-piece, hollow casting, where the juncture of parallel walls thereof render misalignment and displacement impossible. However, there remains the problem of somehow mounting the rope supporting components therewithin. The parallel walls, or the circumferential girth, can have access ports through which said components might be inserted for internal mounting, yet this would weaken the girth or wall areas, lessening the structural strength of the assembly.

The conventional rope block is also a difficult and blind assembly. The hook used to receive a workload, hook bearing, and hook nut need to be assembled internally. Then the hook nut is locked in place by peening the end of the hook shank over the nut. An attached work load must be carried on the threads of this assembly. Now, for one thing, hook nuts have been known to split during the peening operation. For another, if the hook, hook bearing, or hook nut should fail, all three parts may have to be replaced. Often enough the complete rope block assembly has to be replaced. Of course, the replacement procedure requires special tools.

It is an object of this invention to provide a rope block assembly formed of mating castings in which any need for doweling or machined keying is eliminated, but in which an intimate and correct alignment of said castings is assured.

Another object of this invention is to provide a rope block assembly formed of castings having non-machined and non-casting mating surfaces which prevent the displacement of one casting relative to the other.

Another object of this invention is to provide a method of producing a rope block assembly having no need of alignment doweling or machined keying, and presenting two castings having mating surfaces which prevent relative displacement therebetween.

Anther object of the present invention is to provide a safe, easy to assemble rope block accommodating easily replaceable work supporting components.

A feature of this invention comprises the forming of a rope block assembly casting as a single hollow structure and then fracturing the single casting into two parts which then have rough and uneven mating surfaces which facilitate a correct alignment and intimate engagement of the parts.

Another feature of this invention comprises the use of a one-piece hook, with an integral shoulder which eliminates any need for a hook nut.

Further objects and features of this invention will become more apparent by reference to the following description taken in conjunction with the following figures in which:

FIG. 1 is a frontal, elevational view of a rope block assembly, according to my invention, used with a sheave or pulley in association with a hoist or the like;

FIG. 2 is a cross-sectional view in elevation taken along section 2—2 of FIG. 1;

FIG. 3 is a transverse cross-section taken along line 3—3 of FIG. 1;

FIG. 4 is a frontal, elevational view of a rope block assembly, in an alternate embodiment of my invention, used with rope locking means, also for association with a hoist or the like;

FIG. 5 is a vertical cross-section of the rope block assembly of FIG. 4 taken along the vertical axis thereof;

FIG. 6 is a vertical cross-section of the rope block assembly of FIG. 4 taken along section 6—6 of FIG. 5; and FIG. 7 is a cross-sectional view taken along section 7—7 of FIG. 4.

The first embodiment of my rope block assembly 10, according to the invention, comprises a forward shell-like member 12 which is joined to a complementary rearward shell-like member 14. The assembly is adapted to receive a rope 16, which extends thereto from a hoist or similar device (not shown), and carries a hook 18 at the lower end thereof for receiving a work load. Machine screws 20 fasten the two members 12 and 14 together to retain therebetween a rope supporting member as well as hook 18. A shaft 22 is passed through a pulley; the pulley receives the rope for rotational feed thereabout. The shaft 22 has, on either end thereof external to members 12 and 14, small holes to receive cotter pins 24 for retaining the shaft in the assembly.

As shown in FIG. 2, the pulley 26 is mounted on the shaft 22 with a felt oiler 28 disposed therebetween. The two shell-like members 12 and 14 form therebetween an enclosure 30 which has an enlarged area 32 at the lower end thereof.

The hook 18 is a one-piece unit which has integrally formed on the upper end thereof a shoulder 34 which is received in the enlarged area 32. A bearing 36 and washer 38, mounted by passing both over the work-receiving end of the hook 18, are disposed between the shoulder 34 and the members 12 and 14.

As shown to better advantage in FIG. 3 the upper end of the hook block assembly has formed therein cored rope holes 40 through which rope 16 is disposed and run about pulley 26. The shell-like members 12 and 14 are formed with peripheral rims having rough and uneven engaging surfaces 42 which, when joined, form a fracture line 44.

The discontinuities or irregularities of one of the engaging surfaces 42 exactly complement those of the other, along fracture line 44, and effect a faultless alignment and intimate engagement therebetween, by virtue of the process which produces the members 12 and 14. The surfaces 42 are neither machined or cast. They are broken surfaces having a multiplicity of discretely shaped and discretely distributed crests and valleys. And the crests of one member find complementary valleys in the other member with which to engage, and vice versa.

The rope block assembly is produced by forming a single casting with a relieved cross-sectional area 46, as shown in FIG. 3, about the girth thereof. To form the separate members 12 and 14, tapered tools are positioned in each of the core holes 40 in the single hollow casting. Then the tools are pressed into the holes 40, causing the casting to fracture and separate along the fracture line 44 and fully about the girth.

It is to be noted that member 12 has bolt holes 48 and member 14 has tapped holes 50 formed therein, in juxtaposition, to receive the machine screws 20. In producing the block assembly, it is advisable to insert the machine screws 20 through the bolt holes 48 and to turn them part of the way into tapped holes 50, but not turning them down tightly, before fracturing the casting. Then, when the casting is fractured, the two members will be retained together. This will assure a subsequent stocking and storage of mating members. Also, at forming, this precaution will prevent the members from falling away from each other and striking the workbench.

An alternate embodiment of my invention, as shown in FIG. 4, is a rope block assembly 10' used to receive a rope lock device for association with a hoist or the like. The alternate embodiment has a frontal, forward shell-like member 52 and a complementary rearward shell-like member 54. A hook 56 is carried in the lower end of the rope block assembly for receiving work loading. As evidenced by FIG. 5 the rearward member 54 cooperates with forward member 52 (not shown here) to form the internal enclosure 58 by means of the interface of engaging surfaces 60.

In this embodiment the rope is held against movement by means of a wedge 62 and a locking ring 64 mating therewith. A U-shaped clamp 66 is received in a clamp jaw 68, which clamp and jaw secure the end of the rope therebetween. FIG. 6, in vertical cross-section, shows the internal arrangement of the wedge 62 and locking ring 64 for retaining the rope within the enclosure 58. Also there is shown the clamp nuts 70 which fasten the jaw 68 to the clamp 66. FIG. 7 shows the same relieved cross-sectional area 46 along which the fracture line 44 is created. In this embodiment the rope block is formed in the same manner as that of the first embodiment of FIGS. 1 through 3.

In both embodiments the rope block assembly is created by forming a single hollow casting having a relieved cross-sectional area about the girth thereof, and forming one or more holes through the relieved cross-sectional area to receive a tapered tool under pressure to fracture the casting along the fracture line 44. After fracturing there are two parts each of which have mating surfaces with rough and uneven edges, the unevenness of one of said edges being exactly complementary to the unevenness of the other edge. Accordingly, this method of producing a rope block assembly provides for a faultless alignment of the two parts and insures against the displacement of one-half relative to the other.

The rope block assembly of either embodiment can be formed of the initial, single, hollow casting by using the tapered tool in the cored rope holes 40, as earlier explained, or by using the tool in the cored holes through which the hooks 18 and 56 are acommodated. Simply, all that is required is the use of the tool in one or more of the holes noted heretofore, as these holes occur in the relieved cross-sectional area about the girth. Pressing the tool in the rope holes, or the hook hole, or both, will fracture the initial one-piece casting as desired.

It is self-evident that this manner of forming a rope block yields an assembly which is facile and open. The mounting of the rope receiving and work-load supporting means is most readily enabled. Simply by putting said means in place on one of the shell-like members, aligning the other member therewith, and fastening the two together, the assembly is done. Disassembly, for the replacement of the hooks 18 or 56, or the bearing 36, or any of the internal components, is simply and easily accomplished by the removal of the machine screws 20.

Throughout this disclosure I have referred to the element denoted by index numeral 16 as a "rope." Clearly my invention comprises a block assembly, and a method of forming such a block assembly, useful with any rope-like, flexible, linear elements, comprising such elements as organic-material ropes, wire (and other metallic-type) ropes, plastic ropes, chains, belts, and the like. Accordingly, as will be obvious to those skilled in this art, "rope," index numeral 16, is to be construed to mean any of the rope-like elements, and equivalents, suggested here.

While I have described my invention in connection with specific embodiments thereof, it is to be clearly understood that this is done only by way of example and not as a limitation to the scope of my invention as set forth in the objects thereof and in the accompanying claim.

I claim:

1. A rope block assembly first formed of a hollow casting having a continuously relieved cross-section along a predetermined line about the girth thereof with at least one bore formed through both said cross-section and said line;

said casting thereafter having been divided into two parts by pressing a tapered tool into said one bore to fracture said casting, along said line; and rope receiving means, rope, and work load supporting means being disposed between said parts;

said parts being fastened together, said line of fracture being used to effect correct alignment of said parts; and wherein said one bore comprises means for accommodating therethrough a length of said rope.

References Cited

UNITED STATES PATENTS

| 638,772 | 12/1899 | Tarbox | 254—192 |
| 837,703 | 12/1906 | Miller | 254—192 |
| 1,550,113 | 8/1925 | Simpson | 254—192 |
| 2,702,216 | 2/1955 | Stearns | 254—192 |

HARVEY C. HORNSBY, Primary Examiner

U.S. Cl. X.R.

29—527; 254—135; 308—196